US008365419B2

(12) United States Patent
Bernardi et al.

(10) Patent No.: US 8,365,419 B2
(45) Date of Patent: Feb. 5, 2013

(54) ACCESSORY ATTACHMENT SYSTEM FOR AN OSCILLATING POWER TOOL

(75) Inventors: Walter Bernardi, Highland Park, IL (US); Leroy McCray, Chicago, IL (US); Michael E. Landt, Chicago, IL (US)

(73) Assignee: Robert Bosch GmbH, Stuttgart (DE)

( * ) Notice: Subject to any disclaimer, the term of this patent is extended or adjusted under 35 U.S.C. 154(b) by 593 days.

(21) Appl. No.: 12/569,619

(22) Filed: Sep. 29, 2009

(65) Prior Publication Data
US 2011/0072946 A1    Mar. 31, 2011

(51) Int. Cl.
*B23D 49/10*    (2006.01)
(52) U.S. Cl. ............................................. 30/371; 30/392
(58) Field of Classification Search .................... 30/390, 30/511, 370, 371, 372, 373, 374, 392, 393, 30/394
See application file for complete search history.

(56) References Cited

U.S. PATENT DOCUMENTS

| | | | | |
|---|---|---|---|---|
| 2,748,543 | A * | 6/1956 | Pardce | 451/241 |
| 3,270,785 | A | 9/1966 | Molitor | |
| 3,460,408 | A * | 8/1969 | Raymond | 408/112 |
| 3,527,273 | A * | 9/1970 | Falter | 81/429 |
| 5,265,340 | A * | 11/1993 | Nitz et al. | 30/166.3 |
| 5,342,152 | A * | 8/1994 | Medeksza | 408/1 R |
| 5,651,182 | A | 7/1997 | Kim et al. | |
| 5,690,451 | A * | 11/1997 | Thurler et al. | 408/113 |
| 5,815,932 | A | 10/1998 | Presher et al. | |
| 6,463,824 | B1 * | 10/2002 | Prell et al. | 74/417 |
| 6,678,960 | B2 | 1/2004 | Williams | |
| 6,964,546 | B1 * | 11/2005 | Vakil | 408/110 |
| 7,047,650 | B2 | 5/2006 | Chen | |
| 7,261,499 | B2 * | 8/2007 | Mathis et al. | 408/202 |
| 7,823,483 | B2 * | 11/2010 | Yamada | 81/54 |
| 8,109,809 | B2 * | 2/2012 | Bohne et al. | 451/357 |
| 2003/0196336 | A1 | 10/2003 | Alsruhe | |
| 2006/0157284 | A1 * | 7/2006 | Warnicki et al. | 175/263 |

* cited by examiner

*Primary Examiner* — Kenneth E. Peterson
*Assistant Examiner* — Jennifer Swinney
(74) *Attorney, Agent, or Firm* — Maginot, Moore & Beck

(57) ABSTRACT

A power tool having an elongated housing with a nose portion, an output shaft to which a cutting blade that oscillates through a small angle is attached, the attachment comprising, an accessory interface removably mounted to the nose portion of the housing and a depth guide attachment rotatably mounted to the accessory interface, the depth guide attachment further comprising a relatively thin body portion having a generally circular first opening with a center axis generally parallel to the output shaft, the body portion fitting on the accessory interface and being rotatable thereon and having a second circular opening transverse to the first opening center axis, a depth guide member adjustably mounted on the body portion and having an offset outer end portion, and a locking member configured to secure the depth guide member in a desired position.

20 Claims, 8 Drawing Sheets

ACCESSORY ATTACHMENT SYSTEM FOR AN OSCILLATING POWER TOOL

BACKGROUND OF THE INVENTION

The present invention is generally related to portable handheld power tools, and more particularly to accessory attachments for such tools.

Professional artisans, hobbyists and do-it-yourselfers have a relatively new type of power tool for performing cutting, grinding, sanding, scraping and grout removal tasks that are necessary for various repair, remodeling, or restoration projects. The power tool a relatively small handheld tool with an output shaft that moves from side to side through a small arc of about 2 to 3 degrees in an oscillating manner at a high frequency of up to 20,000 or more oscillations per minute. Various tool cutting and scraping blades and sanding attachments can be mounted on the tool. The high frequency side-to-side action optimizes control and provides safe operation, high precision and produces minimal dust. Such a tool is marketed as the Dremel® Multi-Max™ oscillating tool.

SUMMARY OF THE INVENTION

Embodiments of the present invention comprise an accessory attachment system for a power tool having an elongated housing with a nose portion, an output shaft to which a cutting blade that oscillates through a small angle is attached, the orientation of the oscillating blade being generally perpendicular to the output shaft, the attachment comprising, an accessory interface removably mounted to the nose portion of the housing and having a central opening through which the output shaft extends, and a depth guide attachment removably mounted to the accessory interface, and being adjustably rotatable about an axis generally concentric with the output shaft, the depth guide attachment further comprising a relatively thin body portion having a generally circular first opening with a center axis generally parallel to the output shaft, the body portion being configured and sized so that the circular opening fits on the accessory interface and is rotatable thereon and having a second circular opening transverse to the first opening center axis, a depth guide member having an elongated cylindrical mounting portion, a transition portion and an outer end portion, the outer end portion being offset relative to the mounting portion so that the end portion can be adjusted relative to the oscillating blade, and a locking member configured to secure the depth guide member in a desired position.

DETAILED DESCRIPTION

Figure 1:
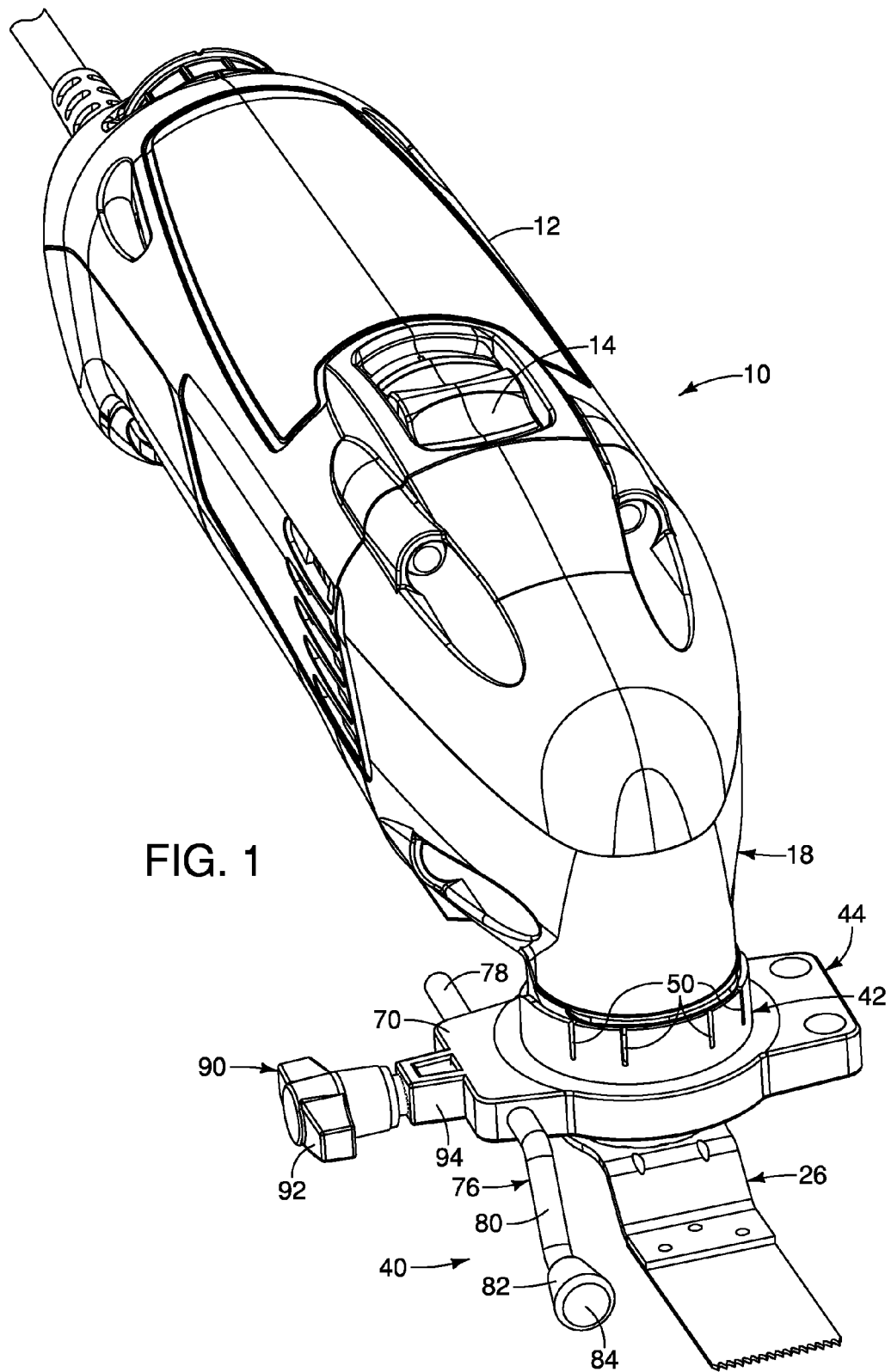
FIG. 1 is a front left perspective view of a hand held power tool of the type which has an oscillating output shaft with an attached cutting blade, and which includes a preferred embodiment of the accessory attachment system of the present invention.

Embodiments of the present invention are directed to an accessory attachment system for use with hand held power tools of the type which have an output shaft that moves in an oscillating manner through a small arc of approximately 2-3° at a high frequency that can extend from less than 10000 oscillations per minute to more than 20000 oscillations per minute. Such tools are marketed by Robert Bosch LLC under the Dremel® brand as the Multi-Max™ oscillating tool and such a tool is shown in the drawings of the present invention. It should be understood that the accessory attachment system, while particularly designed and configured for use with this type of tool, can be configured for use with other types of power tools, if desired.

Figure 2:
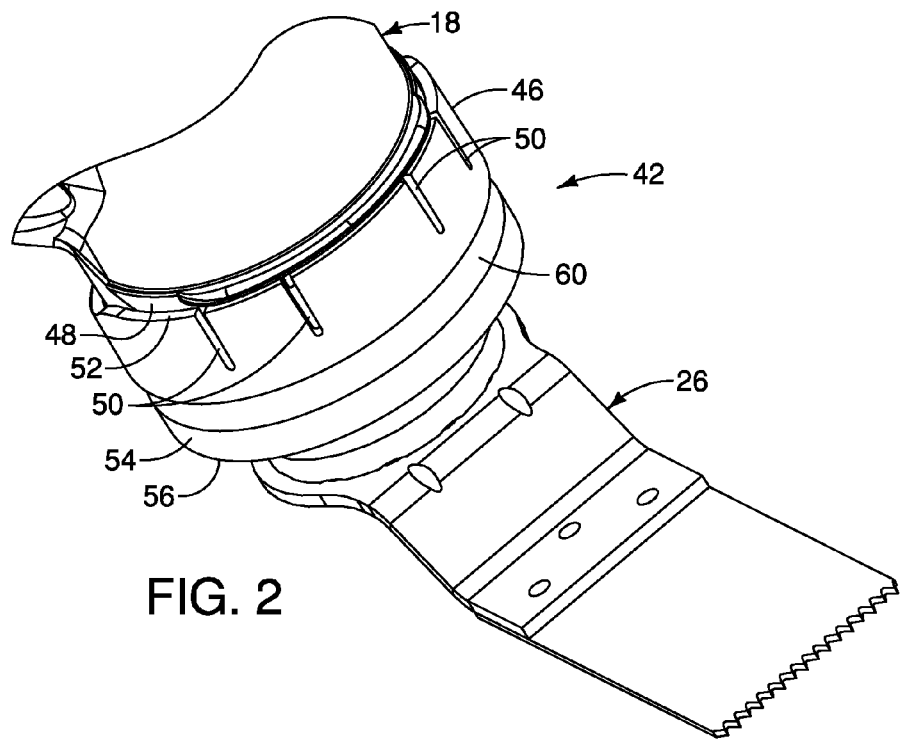
FIG. 2 is a front left perspective view of an accessory interface portion of the accessory attachment system mounted to the power tool shown in FIG. 1 and also including an oscillating saw blade mounted to the tool.
Figure 3:
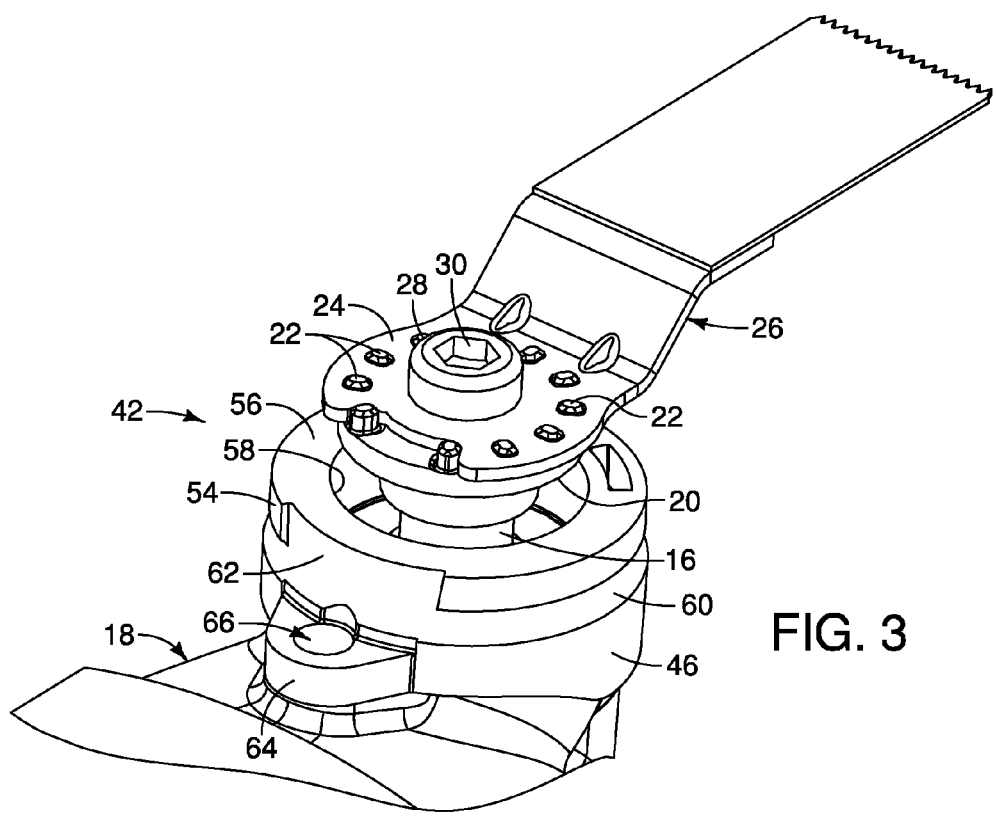
FIG. 3 is a bottom left perspective view of the accessory interface mounted to the power tool shown in FIG. 1 and also including an oscillating saw blade mounted to the tool.
Figure 4:
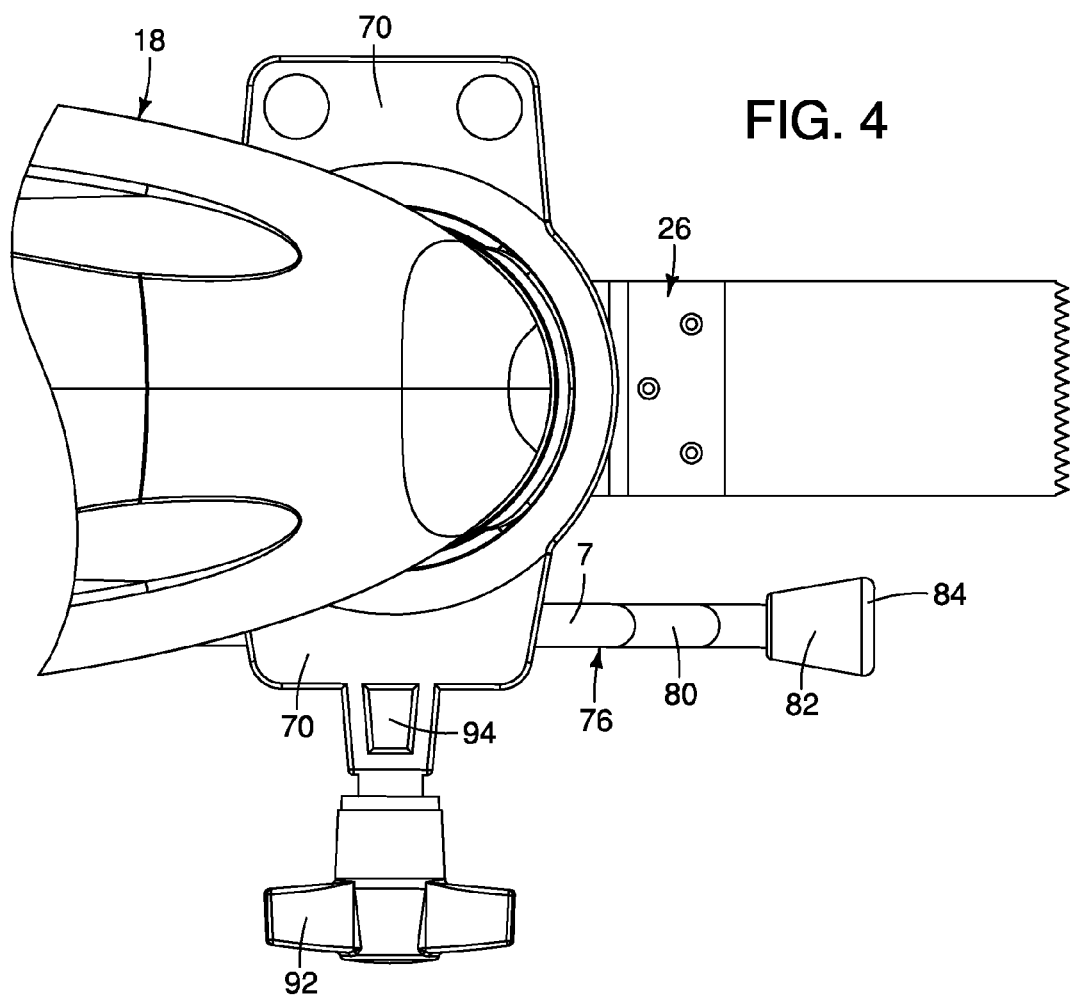
FIG. 4 is a top view of the power tool with the accessory attachment system shown in FIG. 1.
Figure 5:
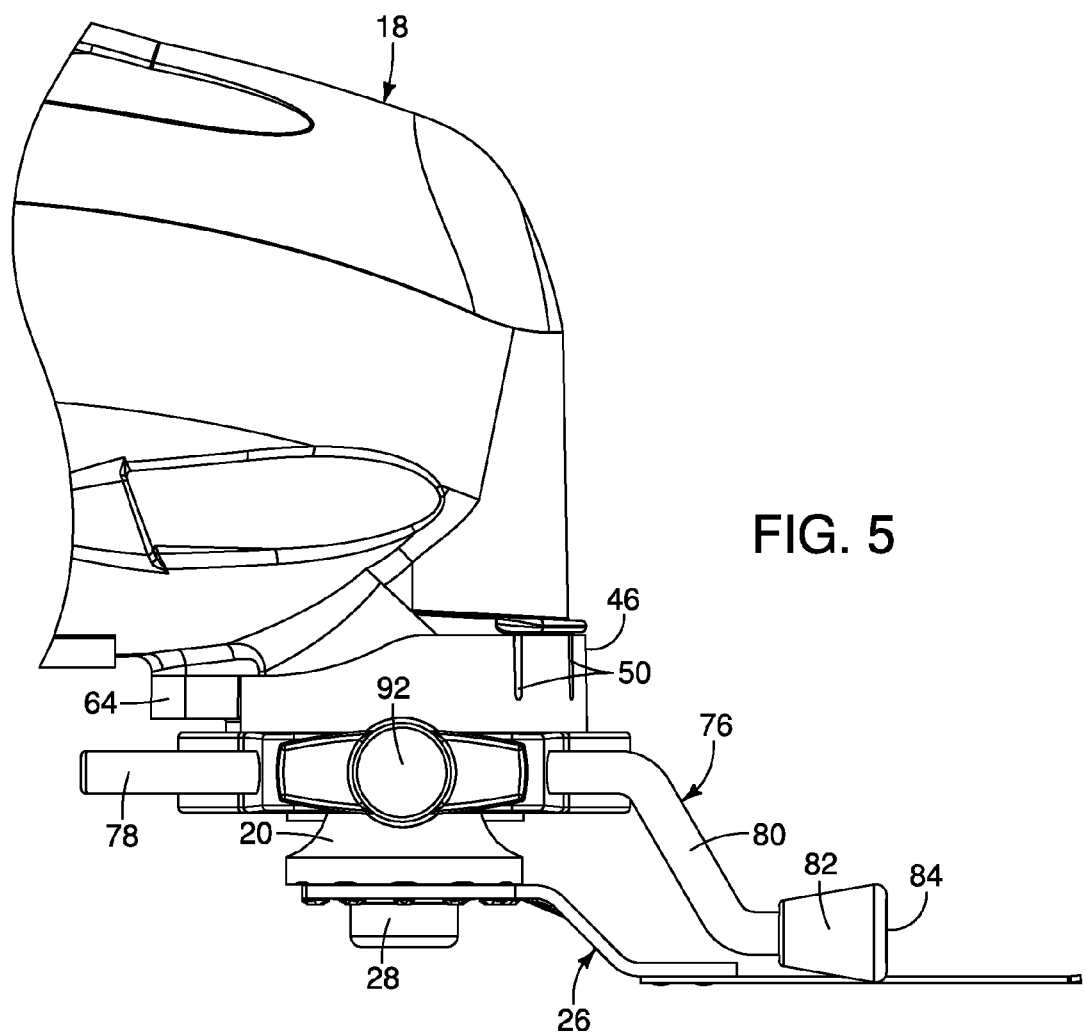
FIG. 5 is a left plan view of the power tool with the accessory attachment system shown in FIG. 1.
Figure 6:
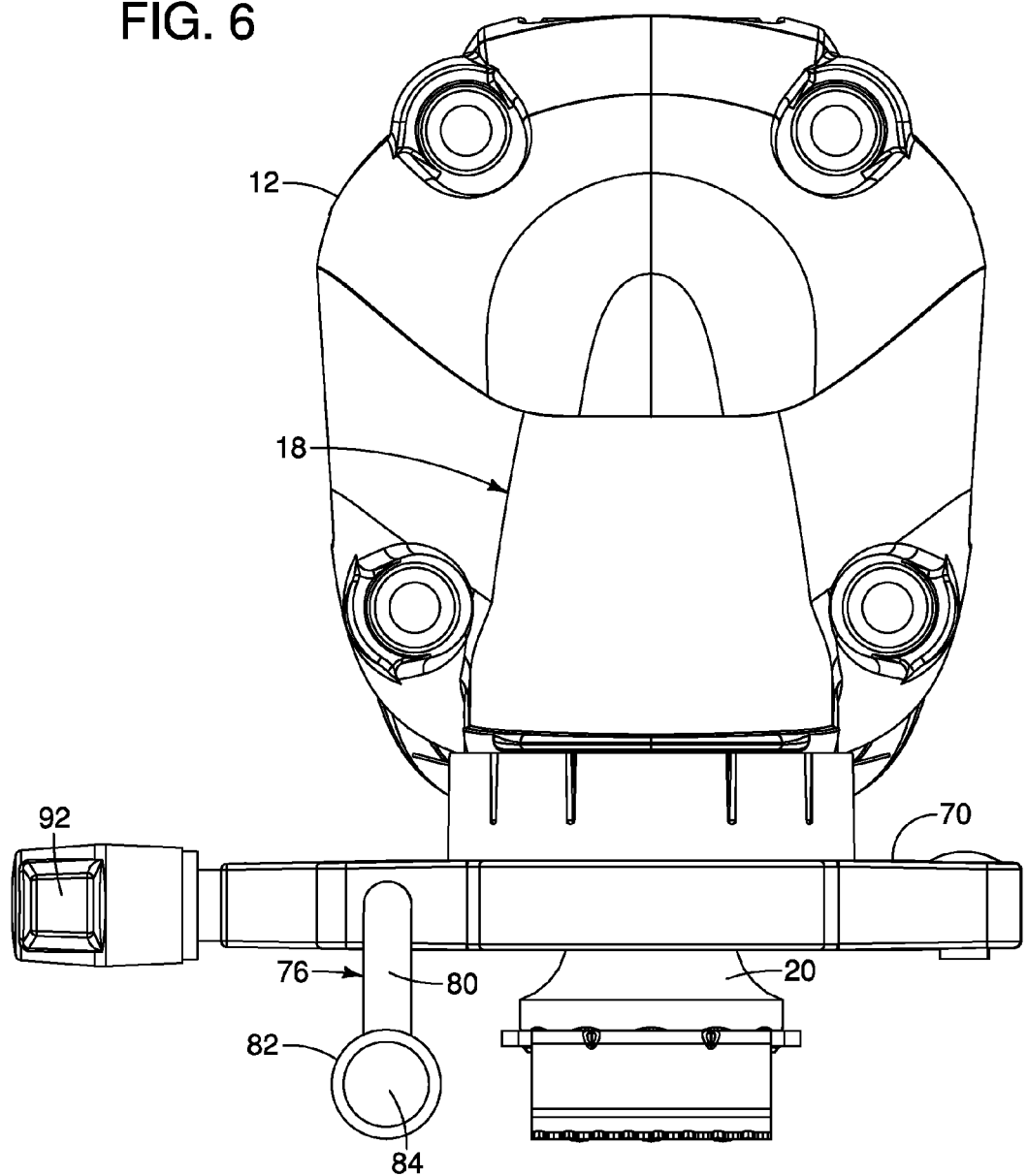
FIG. 6 is a front plan view of the power tool with the accessory attachment system shown in FIG. 1.
Figure 7:
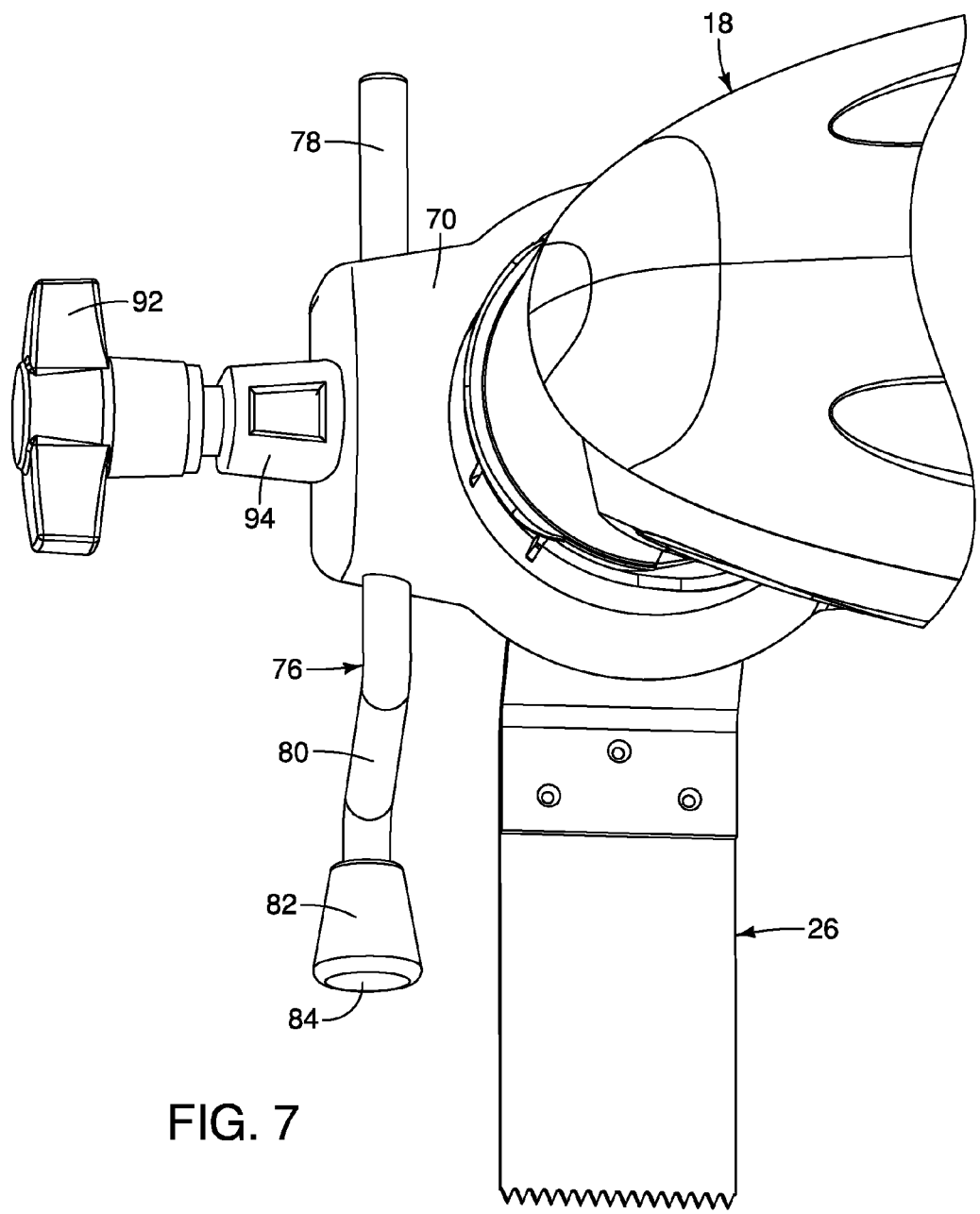
FIG. 7 is a front left perspective view similar to FIG. 1, but illustrating the saw blade as well as a depth guide rotated approximately 90° relative to an accessory interface and housing of the power tool.

Turning now to the drawings, and particularly FIG. 1, an oscillating power tool, indicated generally at 10 in FIGS. 1 and 3, has a generally elongated housing 12 with a longitudinal axis. The tool is configured to be held in one hand of a user and has an on/off operating switch 14 for controlling the operation of a motor located in the housing. A separate speed control switch may be provided for varying the oscillating frequency of the output shaft 16 which is shown in FIG. 3, among other views. The power tool 10 has a nose portion, indicated generally at 18, which extends generally at right angles to the longitudinal axis of the housing 12. A mounting interface 20 is secured to the output shaft 16, which interface 20 includes a number of spaced apart pins 22 configured in a circular pattern to accept and hold a mounting portion 24 of a saw blade, indicated generally at 26. The mounting portion 24 has a number of apertures configured to engage the pins 22 at various angular orientations as desired. As shown in FIGS. 1-6, the blade is oriented to extend in the direction of the longitudinal axis of the housing 12, whereas FIG. 7 shows the blade 24 rotated approximately 90° relative to the longitudinal axis of the housing 12. The mounting portion 24 is secured to the mounting interface 20 by a cap nut 28 that is shown to have a hexagonal recess 30 which can be tightened by a user to firmly hold the blade in place using a suitable Allen wrench or the like.

A preferred embodiment of the complete accessory attachment system is indicated generally at 40 in FIGS. 1, 4-8 and includes an accessory interface, indicated generally at 42 as well as a depth guide attachment, indicated generally at 44.

Figure 9:
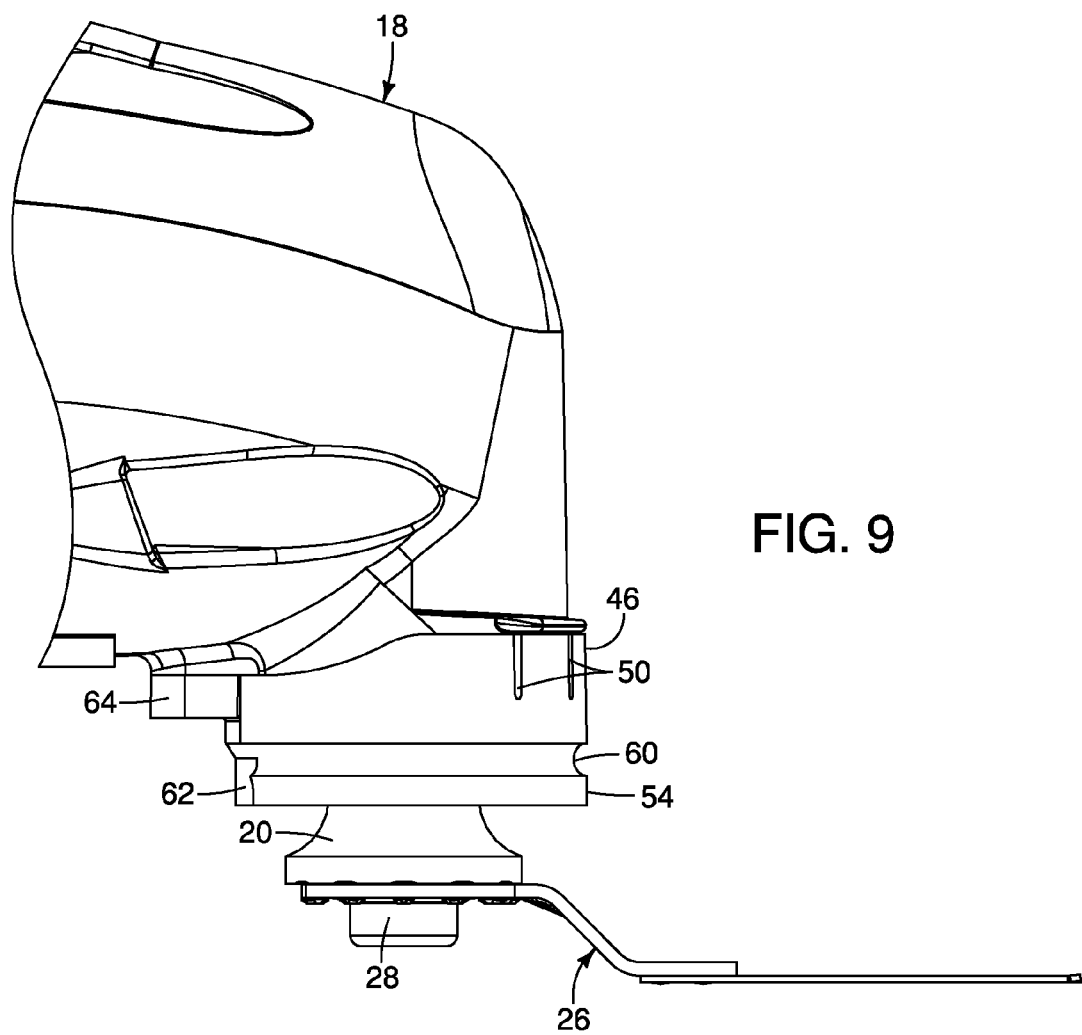
FIG. 9 is a side plan view of a portion of the power tool and accessory interface.

The accessory interface 42 is shown in detail in FIGS. 2, 3 and 9 and it is shown to have a generally cylindrical relatively thin walled inner cylindrical portion 46 which fits around the outer cylindrical surface 48 of the nose portion 18 of the tool. The inner end portion 46 of the accessory interface 42 has a number of transverse slits 50 which extend from an inner end surface 52 outwardly to an outer cylindrical portion 54 which has an end flange portion 56 which defines an opening 58 through which the output shaft 16 and mounting interface 20 extend.

The outer end portion 54 has an annular groove 60 that extends substantially around the entire circumference of the outer end portion 54 and interacts with the depth guide attachment 44 enabling the depth guide attachment to be rotationally positioned on the accessory interface 42 to best cooperate with the angular position of the blade 26. The rear surface of the outer end portion 54 has a reduced diameter recess 62 which is provided to facilitate attachment and removal of the depth guide attachment 44 from the interface 42. As shown in FIG. 3, the recess 62 has a reduced diameter or depth that is generally coextensive with the deepest, i.e., the center of the groove 60 as is best shown in FIG. 9.

As is also best shown in FIG. 9, the outer end portion 54 between the end flange portion 56 and the groove 60 is slightly tapered and of reduced diameter to cooperate with the depth guide attachment 44 enabling it to be snap fitted on and relatively easily removed from the accessory interface 42. The accessory interface 42 is preferably made of a plastic material or a plastic-like material that has some resilience, although it may be made of metal such as aluminum or steel if desired. The thin walled inner end portion 46 contains the slits 50 for the purpose of providing increased flexibility so that the accessory interface 42 can be snap fitted onto the cylindrical portion 48 of the nose portion 18. Once it is snap fitted into place, the outer end portion 54 has a relatively substantial outwardly extending tab 64 that has an aperture 66 sized to receive a screw or the like that can be threaded into an opening (not shown) in the nose portion 18 to firmly hold the accessory interface 42 in place.

Figure 8:
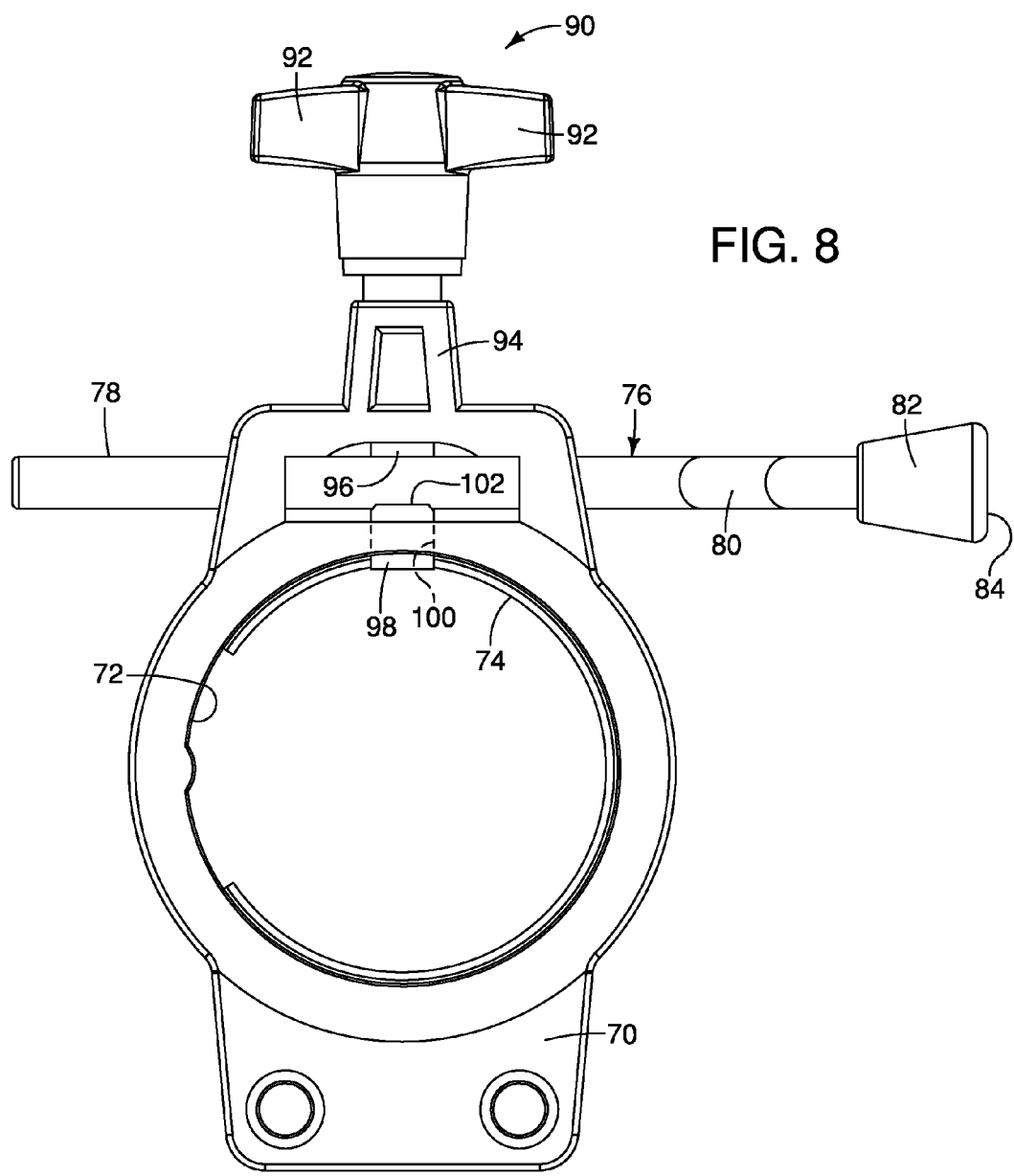
FIG. 8 is a top view of a portion of the depth guide showing a locking mechanism for locking the body of the depth guide to the accessory interface as well as locking the depth guide member in a desired position.

With regard to the depth guide attachment 44 and referring to FIGS. 1 and 4-8, it comprises a relatively thin body portion 70 that has a central opening 72 in which a raised rib 74 is located that extends around a substantial portion of the central opening 72 of the body 70 as shown in FIG. 8. The rib 74 engages the groove 60 of the accessory interface 42 in a manner which enables the body 70 to rotate relative to the accessory interface 42.

The depth guide attachment 44 also comprises a depth guide member, indicated generally at 76, which includes an elongated cylindrical mounting portion 78, a transition portion 80, and an outer end portion 82 which is in the shape of a truncated conical volume having a relatively flat end surface 84. The mounting portion 78 and transition portion 80 is made of generally cylindrical aluminum stock or other metallic stock and has a relatively small diameter of ¼ inch or less. It is sized to be sufficiently strong that it will not be easily bent, and is preferably made of cylindrical stock so that it can be rotated in a suitable aperture of the body 70. Moreover, it is preferably slidable therein so that the position of the end surface 84 relative to the blade can be adjusted to control the depth of cut that is being achieved by the blade 26 during operation of the power tool 10.

The transition portion 80 is provided so that rotation of the depth guide member 76 about the axis of the mounting portion 78 can be made to vary the position of the end surface 84 appropriately on a work piece or work surface that is being cut. In this regard, transition portion 80 is preferably angled within the range of about 30 to about 50 degrees relative to said cylindrical mounting portion 78. It should be understood that the outer end portion 82 can be made of a relatively hard but somewhat resilient material such as rubber or the like so that it will not scratch or mar a surface of material that is being cut.

Once the depth guide member 76 is adjusted to its desired position by sliding and rotating the member relative to the body 70, it can be locked in place by a locking mechanism, indicated generally at 90. The locking mechanism generally comprises a locking knob 92 with a threaded rod portion that threadably engages a nut positioned in the body 70 or the like (not shown), but which is located in a portion 94 of the body 70. The knob 92 has a rod end portion 96 that contacts an outer surface of the cylindrical mounting portion 78. Tightening rotation of the knob 92 will cause the threaded portion to be moved inwardly toward the cylindrical mounting portion of the depth guide member to lock the same. Thus, the depth guide member will be locked in place depending upon the amount of force that is applied by rotating the knob 92.

It should also be understood that the locking mechanism 90 not only locks the depth guide member in place, but also locks the body 70 so that it will not rotate relative to the accessory interface 42. This is achieved by a transfer member 98 which preferably consists of a preferably cylindrical member 98 that fits within an aperture 100 in the body 70 and has a length sufficient so that when the locking mechanism 90 is tightened, the transfer member 98 will be brought into contact with the accessory interface 42 to lock the body 70 in place and prohibit it from being rotated. An opposite end 102 of the transfer member 98 may be appropriately curved to fit around a portion of the circumference of the cylindrical mounting portion 78 as shown in FIG. 8. The thickness of the body portion 70 is preferably minimized, but is slightly larger than the diameter of the cylindrical mounting portion 78 and may be ½ inch or less. This contributes to the ease of use and unobtrusiveness of the depth guide attachment 44. Because of its compact design, it can be mounted onto the accessory interface 42 as well as removed from it without removing the blade 26.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the following claims.

What is claimed is:

1. A power tool having an elongated housing with a nose portion having a generally right angled output shaft to which an oscillating cutting blade is attached, the orientation of the oscillating blade being generally perpendicular to the output shaft, said power tool further having an accessory attachment, said attachment comprising: an accessory interface mounted to the nose portion of the housing and having a central opening through which the output shaft extends; depth guide attachment mounted to said accessory interface, and being adjustably rotatable about an axis generally concentric with the output shaft when said accessory interface is mounted to the nose portion of the housing, said depth guide attachment further comprising:

a relatively thin body portion extending generally perpendicularly to the output shaft of the power tool in at least one direction and having a generally circular opening with a center axis generally parallel to the output shaft when said accessory interface is mounted to the nose portion of the housing, said center opening being configured and sized to fit on said accessory interface and be rotatable relative thereto;

a depth guide member having an elongated generally straight mounting portion and an outer end portion, said mounting portion being adjustably mounted to said body portion at a location outside said circular opening, said adjustment occurring rotationally and in a direction perpendicular to the output shaft of the power tool, the outer end portion being offset relative to said mounting portion so that said end portion can be adjusted relative to the oscillating blade;

a locking member configured to secure at least said depth guide member in a desired position.

2. A power tool as defined in claim 1 wherein said depth guide member can be rotated about a center axis of said generally straight mounting portion and also moved in the lengthwise direction thereof.

3. A power tool as defined in claim 2 wherein said body portion has a second circular opening oriented perpendicular to said center axis for receiving said generally straight mounting portion, said generally straight mounting portion having a circular cross section.

4. A power tool as defined in claim 3 wherein said thin body portion has a thickness slightly larger than the diameter of said second circular opening.

5. A power tool as defined in claim 1 wherein said locking member comprises a rotatable adjustment knob with a threaded portion engaging a threaded aperture in said body portion, wherein an outer end of said threaded portion contacts said generally straight mounting portion of said depth guide member when said adjustment knob is rotated to tighten the same.

6. A power tool as defined in claim 5 wherein said body comprises a transfer portion between said second circular opening and said accessory interface, whereby said transfer portion applies a force against said accessory interface when said locking member contacts said straight mounting portion of said depth guide member responsive to said adjustment knob being tightened, thereby locking said body from rotating relative to said accessory interface.

7. A power tool as defined in claim 6 wherein said transfer portion comprises a moveable member located in a chamber between said second circular opening and said accessory interface.

8. A power tool as defined in claim 1 wherein the output shaft to which the oscillating cutting blade is attached oscillates the blade through an arc of about 2 to about 3 degrees at a high frequency.

9. A power tool as defined in claim 1 wherein said accessory interface has a cylindrical portion with an outer end flanged portion defining a circular opening, an outwardly extending tab with an aperture configured to receive a screw for securing said accessory interface to said housing, said cylindrical portion having an annular groove configured to engage a protruding portion of said depth guide attachment to facilitate rotational movement of said depth guide attachment on said accessory interface.

10. A power tool as defined in claim 9 wherein said cylindrical portion has a plurality of slits therein oriented in a direction parallel to the output shaft extending from an end surface opposite said outer end inwardly therefrom, thereby providing a degree of resilience of said cylindrical portion to facilitate a snap fit relation of said accessory interface on said nose portion of said housing.

11. A power tool as defined in claim 10 wherein said accessory interface is made of a plastic material.

12. A power tool as defined in claim 10 wherein said accessory interface further comprises a recessed portion of an outer wall extending from said outer end flanged portion to said annular groove thereby enabling said depth guide attachment to be mounted on said accessory interface without resistance from said protruding portion of said depth guide attachment.

13. A power tool as defined in claim 1 wherein said outer end portion of said depth guide attachment comprises an enlarged rubber tip.

14. A power tool as defined in claim 13 wherein said depth guide attachment has an angled portion intermediate said generally straight mounting portion and said outer end portion for providing said offset.

15. A power tool having an elongated housing with a nose portion, an output shaft to which a cutting blade that oscillates through a small angle is attached, the orientation of the oscillating blade being generally perpendicular to the output shaft, said power tool further having an accessory attachment, said attachment comprising:

an accessory interface mounted to the nose portion of the housing and having a central opening through which the output shaft extends;

a depth guide attachment mounted to said accessory interface, and being adjustably rotatable about an axis generally concentric with the output shaft when said accessory interface is mounted to the nose portion of the housing, said depth guide attachment further comprising:

a relatively thin body portion having a generally circular first opening with a center axis generally parallel to the outfit shaft when said accessory interface is mounted to the nose portion of the housing, said body portion being configured and sized so that said circular opening fits on said accessory interface and is rotatable thereon and having a second circular opening transverse to said first opening center axis outside said circular opening;

a depth guide member having an elongated cylindrical mounting portion, a transition portion and an outer end portion, said cylindrical mounting portion being adjustably mounted in said second circular opening, said adjustment occurring rotationally and in a direction perpendicular to the output shaft of the power tool, and the outer end portion being offset relative to said mounting portion so that said end portion can be adjusted relative to the oscillating blade;

a locking member configured to secure said depth guide member in a desired position.

16. A power tool as defined in claim 15 wherein said depth guide member is rotatable and slidable relative to said body portion.

17. A power tool as defined in claim 15 wherein the nose portion and output shaft are oriented at an angle relative to the lengthwise direction of the housing.

18. A power tool as defined in claim 17 wherein said predetermined angle is approximately 90 degrees.

19. A power tool as defined in claim 15 wherein said transition portion is angled within the range of about 30 to about 50 degrees relative to said cylindrical mounting portion.

20. A power tool as defined in claim 15 wherein said outer end portion is enlarged compared to said transition portion.

* * * * *